(12) United States Patent
Morgan et al.

(10) Patent No.: US 12,150,227 B2
(45) Date of Patent: Nov. 19, 2024

(54) INDUCTION JUG HEATER

(71) Applicant: BREVILLE PTY LIMITED, Alexandria (AU)

(72) Inventors: Andrew Robert Morgan, Alexandria (AU); Tae-Kyung Kong, Alexandria (AU); Tibor Hegedis, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 907 days.

(21) Appl. No.: 17/256,976

(22) PCT Filed: Jun. 28, 2019

(86) PCT No.: PCT/AU2019/050680
§ 371 (c)(1),
(2) Date: Dec. 29, 2020

(87) PCT Pub. No.: WO2020/000049
PCT Pub. Date: Jan. 2, 2020

(65) Prior Publication Data
US 2021/0185775 A1    Jun. 17, 2021

(30) Foreign Application Priority Data

Jun. 29, 2018  (AU) .............................. 2018902355

(51) Int. Cl.
*A47J 36/24* (2006.01)
*H05B 6/10* (2006.01)
*H05B 6/12* (2006.01)

(52) U.S. Cl.
CPC ........ *H05B 6/1272* (2013.01); *A47J 36/2483* (2013.01); *H05B 6/108* (2013.01)

(58) Field of Classification Search
CPC ................................... H05B 6/12; A47J 36/24
See application file for complete search history.

(56) References Cited

U.S. PATENT DOCUMENTS 5,386,102 A  *  1/1995  Takikawa ............. H05B 6/1227
                                                    219/652
5,512,733 A  *  4/1996  Takikawa ............. H05B 6/1227
                                                    219/622

(Continued)

FOREIGN PATENT DOCUMENTS

GB          2445780 A       7/2008
WO    WO-2016/141645 A1    9/2016

(Continued)

OTHER PUBLICATIONS

European Search Report for EP 19825615.8 dated Mar. 1, 2022.

(Continued)

*Primary Examiner* — Dana Ross
*Assistant Examiner* — Lawrence H Samuels
(74) *Attorney, Agent, or Firm* — MOSER TABOADA

(57) ABSTRACT

An induction heater (10) for a jug (11). The jug (11) includes a base (12) from which there upwardly extends a side wall (13). The induction heater (10) includes an outer housing (15) that encloses that chamber (16). Located in the chamber (16) is the electronic component for the heater (10), including an electronic oscillator (17). The heater (10) includes a cavity (18) within which the jug (11) is located.

5 Claims, 4 Drawing Sheets

(56) References Cited

U.S. PATENT DOCUMENTS

| | | | |
|---|---|---|---|
| 5,630,958 A * | 5/1997 | Stewart, Jr. | H05B 6/365 |
| | | | 219/637 |
| 8,884,196 B2 * | 11/2014 | Jeanneteau | A47J 27/022 |
| | | | 219/621 |
| 2014/0091083 A1 | 4/2014 | McGarvey | |
| 2015/0245421 A1 * | 8/2015 | Heczko | H05B 6/1245 |
| | | | 99/323.3 |
| 2015/0272385 A1 * | 10/2015 | Wang | H05B 6/06 |
| | | | 219/627 |
| 2016/0128503 A1 | 5/2016 | Xu et al. | |
| 2016/0213196 A1 * | 7/2016 | Roever | H05B 6/1245 |
| 2017/0119201 A1 * | 5/2017 | Walker | A47J 43/0465 |
| 2017/0303344 A1 * | 10/2017 | Laghi | H05B 6/105 |
| 2018/0249536 A1 * | 8/2018 | Heczko | H05B 6/1245 |
| 2019/0104880 A1 * | 4/2019 | Ghalambor Dezfuli | |
| | | | A47J 31/005 |
| 2019/0216260 A1 * | 7/2019 | Roever | H05B 6/12 |
| 2020/0069110 A1 * | 3/2020 | Wang | A47J 27/004 |

FOREIGN PATENT DOCUMENTS

| | | |
|---|---|---|
| WO | WO-2016/181208 A1 | 11/2016 |
| WO | WO-2017/157340 A1 | 9/2017 |

OTHER PUBLICATIONS

International Search Report for Application No. PCT/AU2019/050680, mailing date Sep. 6, 2019.
European Search Report for Application No. 19 825 615.8-1015 dated Apr. 9, 2024.

* cited by examiner

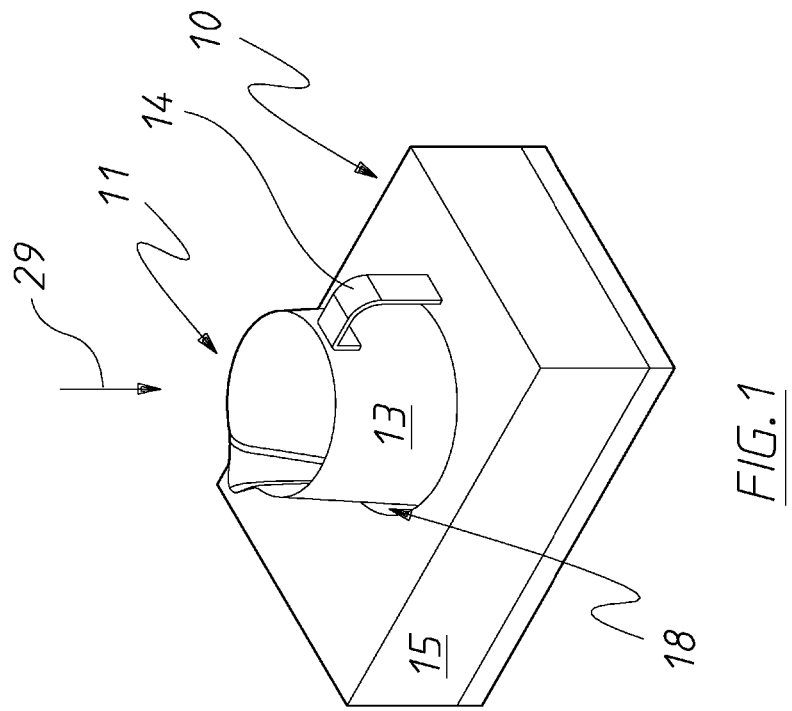
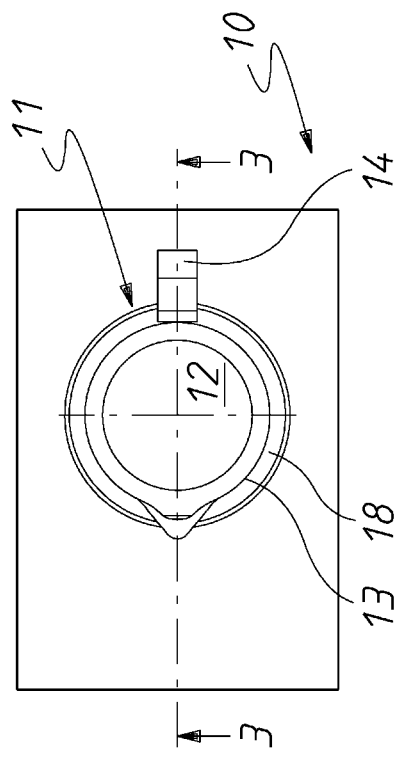
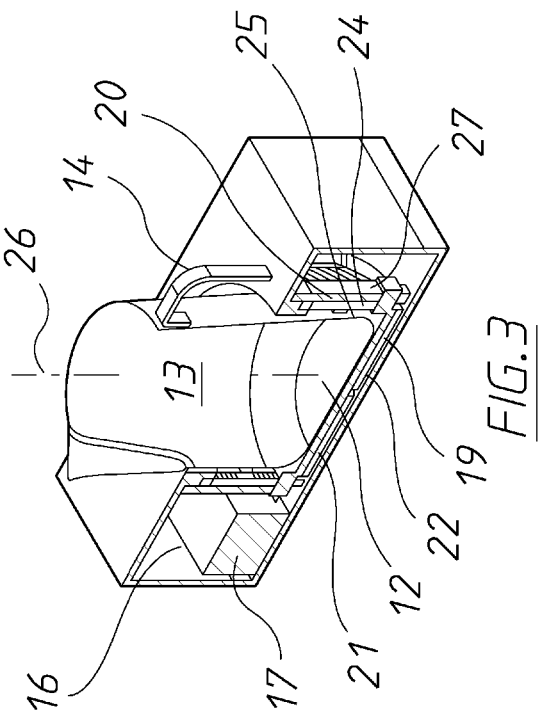

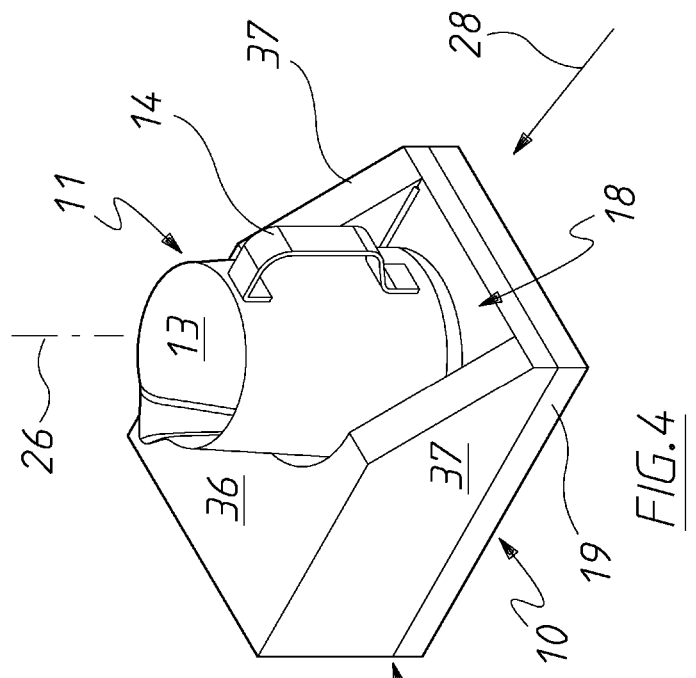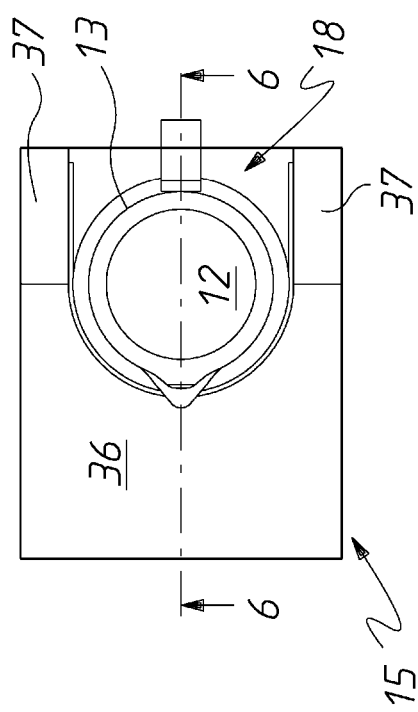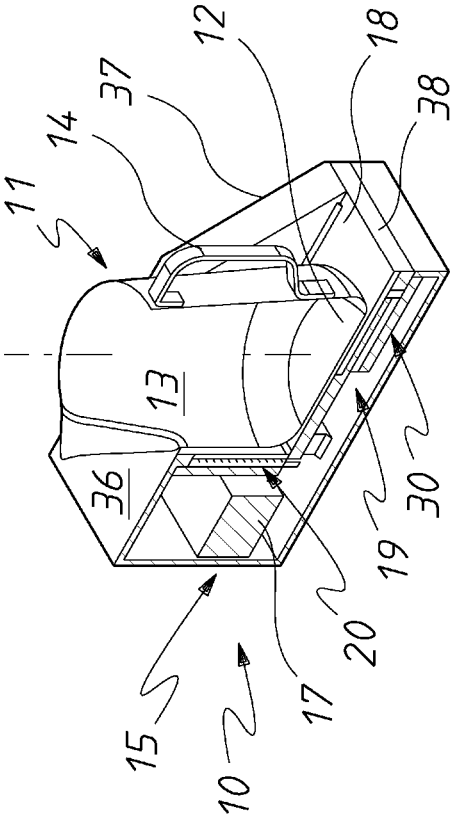

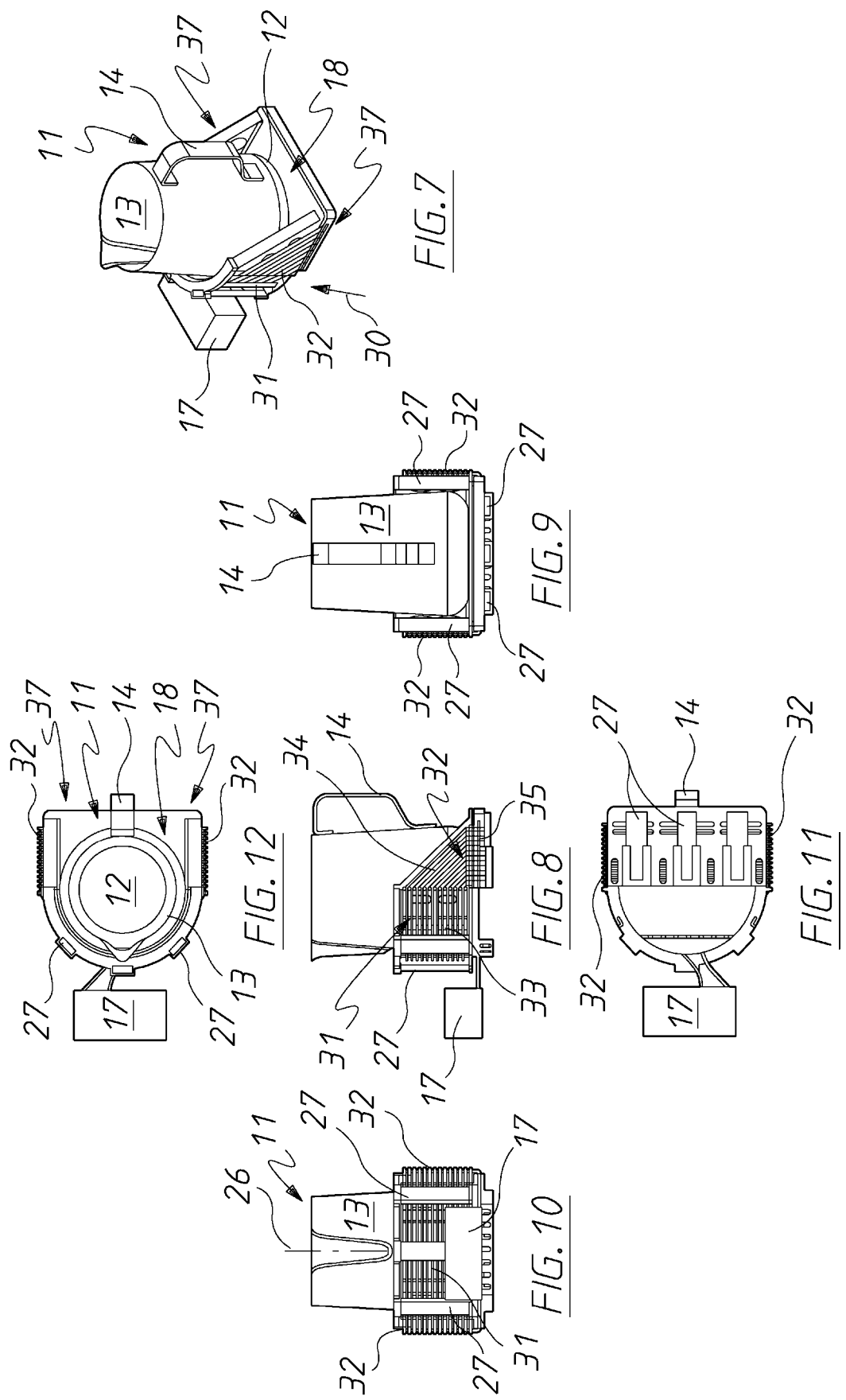

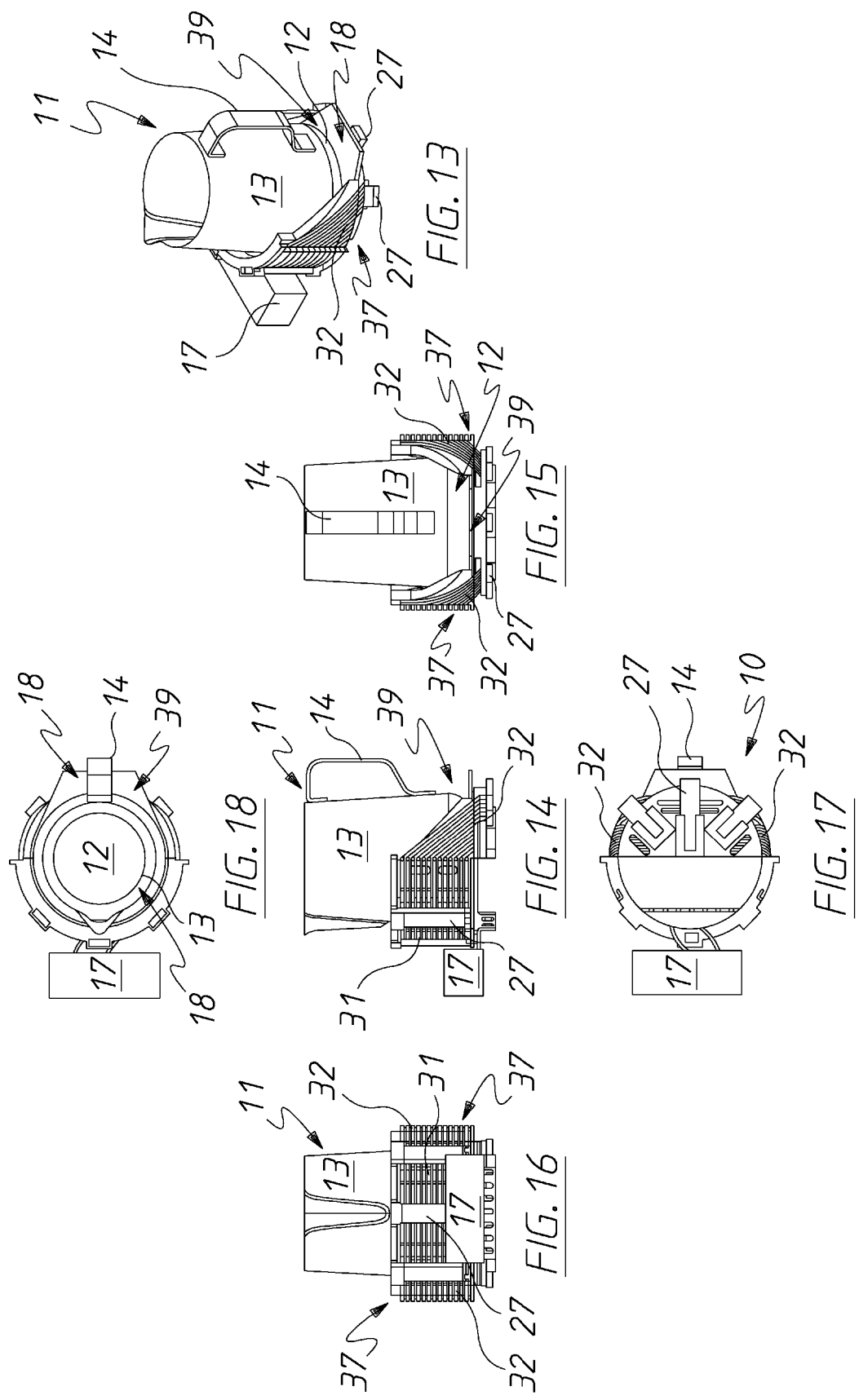

INDUCTION JUG HEATER

FIELD

The present invention relates to induction heaters and more particularly but not exclusively to induction heaters to heat containers such as jugs.

BACKGROUND

Induction heaters employed in the food industry, include a plate upon which a container, that receives the food, is to rest. The plate includes an induction coil that is energised to heat the container, and therefore the food contained therein.

A disadvantage of the above discussed induction heaters is that considerable time is required to heat the container, and therefore the food contained therein.

OBJECT

It is the object of the present invention to overcome or substantially ameliorate the above disadvantage.

SUMMARY OF INVENTION

There is disclosed herein an induction heater for a container, the container having a base and an upwardly extending side, with the side and the base each being at least partly formed of ferromagnetic material, and at least partly enclosing a space to receive the container, the induction heater including:

a heater base including at least a portion of a base induction coil;

a heater side extending upwardly from the heater base and at least partly enclosing, with the base, a space to receive the container, the heater side including at least a portion of a side induction coil; and connections to deliver an alternating current to both the coil portions so as to deliver to the space a magnetic field to cause heating of the container.

Preferably, the base coil is a complete coil and is wound so as to have a predetermined winding direction;

and the side induction coil is a complete coil and is wound so as to have a winding direction opposite the winding direction of the base coil.

Preferably, the heater side surrounds said space, and the side coil is wound so as to surround said space.

Preferably, the base induction coil is of a spiral configuration.

Preferably, the base induction coil is of a two-dimensional spiral configuration.

Preferably, the side induction coil is a three-dimensional spiral configuration.

In an alternative preferred form, the base induction coil portion and the side induction coil portion are coupled so as to be provided by a complete coil with windings, the windings including a winding portion provided by the heater base, and winding portions provided by the heater side.

Preferably, the winding portions provided by the heater side include inclined windings, inclined to the heater base.

BRIEF DESCRIPTION OF DRAWINGS

Preferred forms of the present invention will now be described by way of example with reference to the accompanying drawings wherein:

FIG. 1 is a schematic isometric view of an induction jug heater and a jug;

FIG. 2 is a schematic top plan view of the heater and jug of FIG. 1;

FIG. 3 is a schematic sectioned isometric view of the heater and jug as shown in FIG. 2 sectioned along the line 3-3;

FIG. 4 is a schematic isometric view of a modification of the heater and jug of FIG. 1;

FIG. 5 is a schematic top plan view of the heater and jug of FIG. 4;

FIG. 6 is a schematic sectioned isometric view of the heater and jug as shown in FIG. 5 sectioned along the line 6-6;

FIG. 7 is a schematic isometric view of the heater and jug of FIG. 4, with an outer housing removed;

FIG. 8 is a schematic side elevation of the heater and jug as shown in FIG. 7;

FIG. 9 is a schematic front elevation of the heater and jug as shown in FIG. 7;

FIG. 10 is a schematic rear elevation of the heater and jug as shown in FIG. 7;

FIG. 11 is a schematic bottom plan view of the heater and jug of FIG. 7;

FIG. 12 is a schematic top plan view of the heater and jug of FIG. 7;

FIG. 13 is a schematic isometric view of a modification of the heater and jug as shown in FIG. 7;

FIG. 14 is a schematic side elevation of the heater and jug of FIG. 13;

FIG. 15 is a schematic front elevation of the heater and jug of FIG. 13;

FIG. 16 is a schematic rear elevation of the heater and jug of FIG. 13;

FIG. 17 is a schematic bottom plan view of the heater and jug of FIG. 13; and

FIG. 18 is a schematic top plan view of the heater and jug of FIG. 13.

DESCRIPTION OF EMBODIMENTS

In FIGS. 1, 2 and 3 of the accompanying drawings there is schematically depicted an induction heater 10 to heat a jug 11. The jug 11 includes a base 12 from which there upwardly extends a side 13. Preferably the jug 11 has a handle 14 that extends laterally from the side 13.

Preferably the side 13 is circular in transverse cross-section, and tapers upwardly from the base 12.

The induction heater 10 includes an outer housing 15 that encloses a chamber 16. Located in the chamber 16 is the electronic components for the heater 10, including an electronic oscillator 17.

The induction heater 10 includes a cavity 18 within which the jug 11 is located.

At least partly enclosing the cavity 18 is a cavity base 19 and a cavity side wall 20. In this embodiment the cavity side wall 20 is generally circular in configuration, and is configured so as to be located relatively close to the jug side 13.

The cavity base 19 includes a base induction coil 21 that includes a plurality of windings 22 that are generally located in a flat plane. The plane is generally horizontal, and the windings 22 extend angularly about a generally upright central axis 26. The base induction coil 21 is of a two-dimensional spiral configuration.

The cavity side wall 20 includes a side induction coil 24 that includes a plurality of windings 25. The windings 25 are wound about the axis 26 so as to be provided with a three-dimensional spiral configuration.

The axis 26 is generally upright, and generally perpendicular to the base 19.

The base and side induction coils 21 and 24 are preferably formed by a single wire strand.

The base and induction coils 21 and 24 are connected to the electronic oscillator 17 so as to receive the alternating current therefrom. Preferably the oscillator 17 provides a high frequency alternating current. The base and side induction coils 21 and 24 are complete induction coils.

There is preferably located adjacent the cavity side wall 20, and preferably adjacent the windings 25, members 27, located at equally spaced angular positions about the axis 26, and that are elongated in the direction of the axis 26. The members 27 aid in deforming the magnetic field produced by the coil 24 so as to be concentrated with respect to the jug 11. The members 27 may be formed of ferromagnetic material or may be ceramic.

Preferably the base 19 is provided with members similar to the members 27.

In the embodiment of FIGS. 4 to 12, the cavity 18 has an open side, so that the jug 11 may be inserted in the cavity 18 by horizontal movement in the direction 28, that is a direction generally perpendicular to the axis 26. In the embodiment of FIG. 1, the jug 11 is inserted in a downward vertical direction 29, the direction 29 is generally parallel to the axis 26.

In the embodiment of FIGS. 4 to 12, there is provided a complete coil 30, the complete coil 30 includes the coil portion 31 provided by the cavity side wall 20, and the coil portion 32 provided by the base 19. The coil portion 31 includes winding portions 33 that extend to inclined winding portions 34. The inclined winding portions 34 extending to winding portions 35, providing the coil portion 32, and are inclined to the base 19 by an acute angle. The complete coil 30 is formed by winding a single wire strand, that forms a single spiral winding.

In this respect it should be appreciated that the coil portions 31 and 32 cooperate to provide the complete coil 30, with each winding portion 34 combining with respective winding portions 34 and 35 to provide a complete winding.

The housing 15 provides an end wall 36 (that provides the winding portion 33), as well as two side wall portions 37 (each providing a respective one of the winding portions 34), with the base 19 providing the winding portion 35.

The complete coil 30 is connected to the electronic oscillator 17 as previously described.

Preferably the complete winding 30 is also operatively associated with metal members 27 as described with the previous embodiment.

In the embodiment of FIGS. 14 to 18, the side wall portions 37 are arcuate when viewed in top plan so that there is an entrance area 39, that adjacent the floor 38, is narrower than the width of the jug 11. Accordingly, the jug 11 can be inserted in the cavity 18 in a direction that has a vertical component and a horizontal component.

The above described preferred embodiments have the advantage of providing a magnetic field that heats the jug base 12, and at least portion of the jug side or sides 13.

The invention claimed is:

1. An induction heater for a container, the container having a base and an upwardly extending side, with the side and the base each being at least partly formed of ferromagnetic material, and at least partly enclosing a space to receive the container, the induction heater including:
   a heater base including at least a portion of a base induction coil, the base induction coil including a plurality of windings that extend angularly about a central axis that is perpendicular to the base;
   a heater side extending upwardly from the heater base and at least partly enclosing, with the base, a space to receive the container, the heater side including at least a portion of a side induction coil, the side induction coil including a plurality of windings that are wound about the central axis in a three-dimensional spiral configuration, wherein the side induction coil is inclined to the heater base at an acute angle;
   connections to deliver an alternating current to both the coil portions so as to deliver to the space a magnetic field to cause heating of the container; and
   at least two members located adjacent the side induction coil at spaced angular positions about the central axis, the at least two members being elongated in the direction of the central axis,
   wherein the at least two members are configured to aid in deforming the magnetic field so as to be concentrated with respect to the container, and
   wherein the base induction coil and the side induction coil are coupled to form a complete coil formed by winding a single wire strand.

2. The heater of claim 1, wherein the heater side surrounds said space, and the side induction coil is wound so as to surround said space.

3. The heater of claim 1, wherein the base induction coil is of a spiral configuration.

4. The heater of claim 1, wherein the base induction coil is of a two-dimensional spiral configuration.

5. A jug having the induction heater of claim 1.

\* \* \* \* \*